(12) United States Patent
Sharma et al.

(10) Patent No.: US 7,719,722 B2
(45) Date of Patent: May 18, 2010

(54) SYSTEM AND METHOD OF HALFTONING FOR MULTI-PASS RENDERING

(75) Inventors: Gaurav Sharma, Webster, NY (US); Shen-ge Wang, Fairport, NY (US); Zhigang Fan, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 2560 days.

(21) Appl. No.: 10/044,468

(22) Filed: Jan. 11, 2002

(65) Prior Publication Data
US 2003/0133160 A1   Jul. 17, 2003

(51) Int. Cl.
*G06K 15/00* (2006.01)
*H04N 1/405* (2006.01)
*B41J 2/205* (2006.01)

(52) U.S. Cl. ............... 358/3.14; 358/3.06; 358/3.19; 358/3.21; 347/15

(58) Field of Classification Search ........... 358/1.9, 358/3.03, 3.06, 3.09, 3.14, 3.16, 3.19, 3.21; 347/15
See application file for complete search history.

(56) References Cited

U.S. PATENT DOCUMENTS

| 5,673,121 | A | | 9/1997 | Wang | |
|---|---|---|---|---|---|
| 5,880,857 | A | * | 3/1999 | Shiau et al. | 358/3.03 |
| 6,014,233 | A | | 1/2000 | Fan et al. | |
| 6,014,500 | A | * | 1/2000 | Wang | 358/1.9 |
| 6,072,591 | A | | 6/2000 | Harrington | |
| 2002/0024548 | A1 | * | 2/2002 | Gotoh et al. | 347/15 |

* cited by examiner

*Primary Examiner*—James A Thompson
(74) *Attorney, Agent, or Firm*—Fay Sharpe LLP

(57) ABSTRACT

A system and method for halftoning for multi-pass rendering of an image in which different pixel locations are rendered in each pass which reduces the effects of inter-pass mis-registration errors. The method of halftoning includes restricting a substantial majority of the pixels turned on to render a tone to the minimum number of passes required to produce the tone. The halftoning method can include generating a stochastic halftone turn-on sequence and re-ordering the turn-on sequence. The halftoning method can also use error diffusion, adding a zero mean bias signal to either the image input pixels or the threshold values. The halftoning method is applicable to color or black and white rendering.

27 Claims, 8 Drawing Sheets

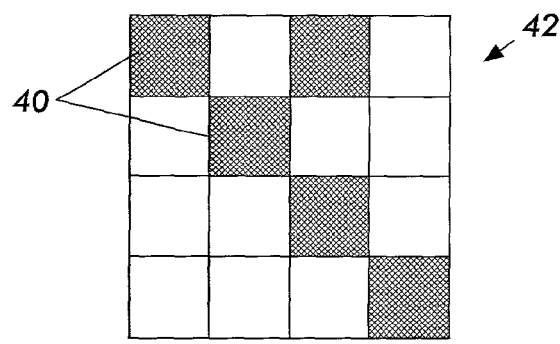
*FIG. 7*
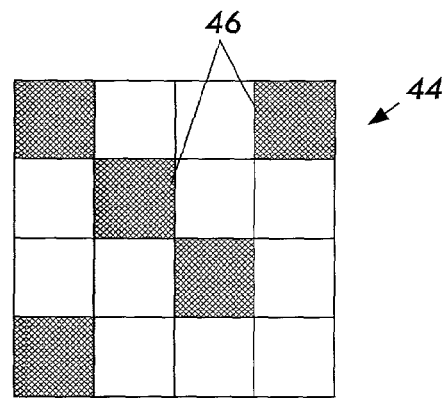
*FIG. 8*
*FIG. 9*

SYSTEM AND METHOD OF HALFTONING FOR MULTI-PASS RENDERING

BACKGROUND

The present invention relates to a system and method of halftoning for multi-pass rendering, and more particularly to a system and method of halftoning for reducing the effects of inter-pass mis-registration in multi-pass printing.

With the advent of inexpensive digital color printers, methods and systems of digital halftoning have become increasingly important. It is well understood that most digital printers operate in a binary mode, i.e., for each tonal separation, a corresponding spot is either printed or not printed at a specified location or pixel. Digital halftoning controls the printing of tonal spots, where spatially averaging the printed spots of one or more tonal separations provides the illusion of the required continuous contone.

A common halftone technique is screening, which compares the required continuous tone level of each pixel for each separation with one of several predetermined threshold levels. The predetermined threshold levels are stored in a two-dimensional threshold array called a half tone screen. If, in any given region of the image, the required tone level is darker than the threshold halftone level, the pixel is turned on and printed. These pixels can be referred to as black pixels, even though they may be printed in color. Pixels not turned on are not printed and can be referred to as white pixels. It is understood in the art that the distribution of black pixels depends on the design of the halftone screen.

Some known inkjet printers print with multiple passes. With multi-pass printing, the image pixels are spatially partitioned into sets, or partitions, and a different partition is printed in each pass. Multi-pass printing can allow for better ink drying and can reduce the visibility of print head signature caused by deviations in the size and positioning of the printed dots.

A common multi-pass printer is a two-pass printer, though multi-pass printers can use any suitable number of passes. Two-pass printers print some of the black pixels in the first pass and the rest of the black pixels in the second pass. Often, one pass is printed in the forward direction of head traversal and the other in the reverse direction.

If the alignment or registration between the passes is near perfect, the graininess of the resulting images is largely unchanged in comparison with a printer that prints the entire image in a single pass. However, if there is mis-registration between the two passes the partitions can "beat" with each other to produce undesired textures that result in considerably increased graininess in the printed image.

Mis-registration in inkjet printers arises from mechanical positioning errors between the passes. Increasing the precision in the mechanical positioning can mitigate the problem of mis-registration. However, this solution can be costly due to the tight tolerances required particularly at high resolutions.

Mis-registration that is identical from page to page over the life of the printer can be detected a priori and compensated for electronically. However, electronic compensation of each individual printer also adds cost to printers. Also, electronic compensation cannot correct registration errors under half a pixel without excessive computation.

It is desirable to provide halftone screens, which reduce the effects of mis-registration in multi-pass printers in a highly accurate yet cost effective manner.

SUMMARY OF THE INVENTION

A system and method for halftoning for reducing the effects of mis-registration in multi-pass printing. The system and method for halftoning provide increased robustness to inter-pass registration errors by primarily using the pixels from a single partition for printing in the highlight regions where graininess is the biggest problem. By concentrating the minority black pixels in a single pass, the systems and methods of the invention ensure that the gap between the minority pixels is not affected by inter-pass mis-registration errors. A similar benefit is also obtained in the shadow regions by similarly restricting a substantial majority of the minority white pixels to a single pass.

The method of halftoning for multi-pass rendering includes restricting a substantial majority of the pixels turned on to render a tone to the minimum number of passes required to produce the tone. The substantial majority can be approximately 75% or more, or more preferably approximately 90% or more, of the pixels turned on to render a tone.

The halftoning method can include generating a stochastic screen pixel turn-on sequence and re-ordering the turn-on sequence. The halftoning method can also use error diffusion, adding a zero mean bias signal to either the image input pixels or the threshold values. The halftoning method is applicable to color or black and white rendering.

The system of halftoning for multi-pass rendering of an image having pixels, wherein different pixels are rendered in each pass, includes means for restricting a substantial majority of the pixels turned on to render a tone to the minimum number of passes required to produce the tone.

BRIEF DESCRIPTION OF THE DRAWINGS

The drawings are only for purposes of illustrating preferred embodiments and are not to be construed as limiting the invention. The invention may take form in various components and arrangements of components, and in various steps and arrangements of steps, preferred embodiments of which will be illustrated in the accompanying drawings wherein:

FIG. 7 is a diagram illustrating rendered pixels in accordance with the stochastic halftone screen of FIG. 6;

FIG. 8 diagram illustrating rendered pixels in accordance with a stochastic halftone screen generated using the pixel turn-on sequence of FIG. 2;

FIG. 9 is a diagram illustrating the zero mean bias signals arranged in the checkerboard partition arrangement shown in FIG. 1;

DETAILED DESCRIPTION OF THE INVENTION

It is to be understood that the specific devices and processes illustrated in the attached drawings, and described in the following specification are simply exemplary embodiments of the inventive concepts defined in the appended claims. Hence, specific examples and characteristics relating to the embodiments disclosed herein are not to be considered as limiting, unless the claims expressly state otherwise.

Figure 1:
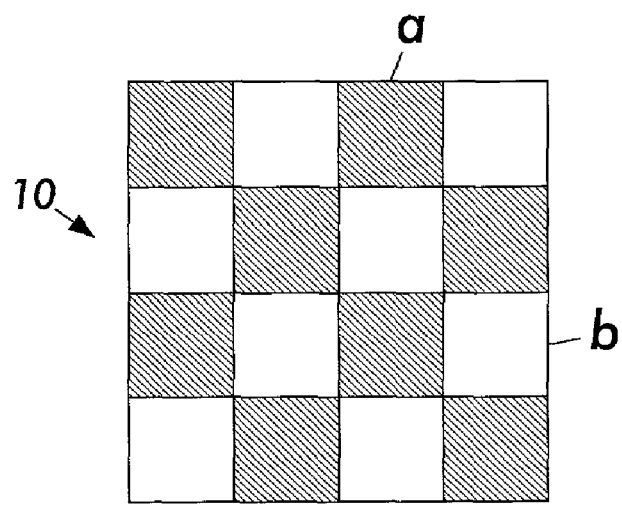
FIG. 1 is a diagram illustrating a checkerboard partition.

For the purposes of example the invention is described for two-pass printing, although it should be noted the invention is applicable to any multi-pass printing scheme. Further, a "checkerboard" two-pass partition is used, as shown generally at 10 in FIG. 1. In the checkerboard partition 10, each cross-hatched square a corresponds to a pixel in a first partition S1 and each white square b corresponds to a pixel in a second partition S2. However, the ideas and algorithms developed are equally applicable to other known partitions, including but not limited to alternate line partitions using even and odd rows/columns, stochastic partitions, or any other suitable known partitions.

A first embodiment of the invention uses stochastic screening similar to the method of generating a stochastic halftoning screen as taught in U.S. Pat. Nos. 5,673,121 and 6,014,500 to Wang which are hereby incorporated herein by reference. The method of halftoning as described below in relation to stochastic screening can include generating the stochastic screen and applying the screen to render an image.

The design of the stochastic screen S is a mathematical optimization process having a single-valued merit function M(S), an example of which is disclosed in the above referenced U.S. Pat. No. 5,673,121. The screen S is partitioned into two subsets: S1 is defined by all pixels, which are printed in the first pass (including black pixels which are turned on, and white pixels which are not turned on), and S2 is defined by all the pixels which are printed in the second pass (including black pixels which are turned on, and white pixels which are not turned on). For the checkerboard partition described above, the pixels can be classified as belonging to the two partitions using the coordinates of columns and rows, i and j, and the mathematical rule $p(i,j) \in S1, if (i+j)\%2=0;$ $p(i,j) \in S2, if (i+j)\%2=1;$ $S=S1+S2.$ A new merit function, $\tilde{M}(S)$, is used which is composed of three parts:

$\tilde{M}(S)=M(S)+w_1*M(S1)+w_2*M(S2),$ where M( ) is a merit function similar to the merit function for a single screen, and $w_1$ and $w_2$ are weighting factors which control the relative importance of textures in partitions S1 and S2, respectively, in relation to the overall textures.

In the example provided, $w_1 \approx 3$ and $w_2 \approx 3$, although these weighting factors can each have a different value, and the values can be in the range of approximately 2 to 100. The higher weighting for the S1 and S2 partitions in the merit function ensure that the textures obtained from the process of partitioning the original turn-on sequence and re-arranging it as described below produces pleasing halftone textures.

Optimizing the merit function produces a pixel turn-on sequence for the entire stochastic screen S. The pixel turn-on sequence, also be referred to as a stochastic screen pixel turn-on sequence, is a pixel turn-on sequence used for generating a stochastic halftone screen S. The pixel turn-on sequence gives the sequence for turning on successive pixels in S, as will be described below, such that the pleasing appearance is maintained as each successive pixel is turned on and thus printed.

Figure 2:
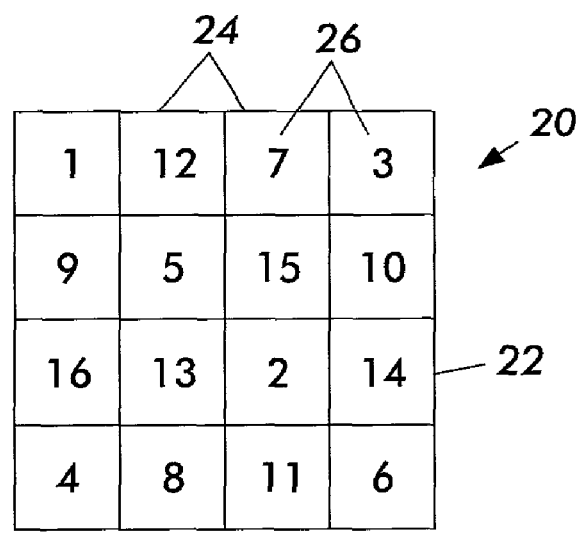
FIG. 2 is a diagram illustrating a stochastic screen pixel turn-on sequence.

Referring to FIG. 2, the pixel turn-on sequence generated in accordance with the first embodiment is shown generally at 20. The pixel turn-on sequence 20 is shown as a 4×4 screen 22, having sixteen screen elements 24 each corresponding to a pixel for an input image with 17 possible input levels, ranging from 0 through 16. Each screen element 24 includes a turn-on sequence value 26 representing the sequence order in which the pixel is turned on, from the lowest to the highest value, when halftoning a constant input image, or portion thereof. This example is for purposes of illustration only and the pixel turn-on sequence can be optimized further by known methods. Also, typical stochastic screens are usually larger than 4×4.

Figure 3:
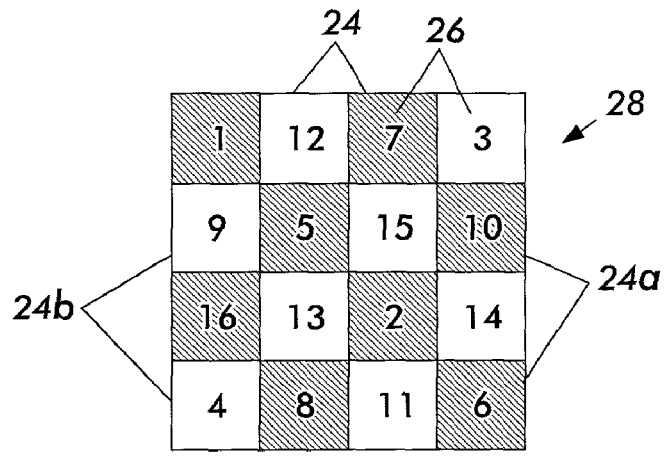
FIG. 3 is a diagram illustrating the stochastic screen pixel turn-on sequence of FIG. 2 partitioned into the checkerboard partition illustrated in FIG. 1.

Next, the turn-on sequence 20 is partitioned or split up into partitions. For this example, halftoning for two-pass rendering using a checkerboard partition, the partitioned turn-on sequence is shown generally at 28 in FIG. 3. The turn-on sequence values 26 are shown partitioned into a first partition S1 occupying screen elements 24a and a second partition S2 occupying screen elements 24b.

Figure 4:
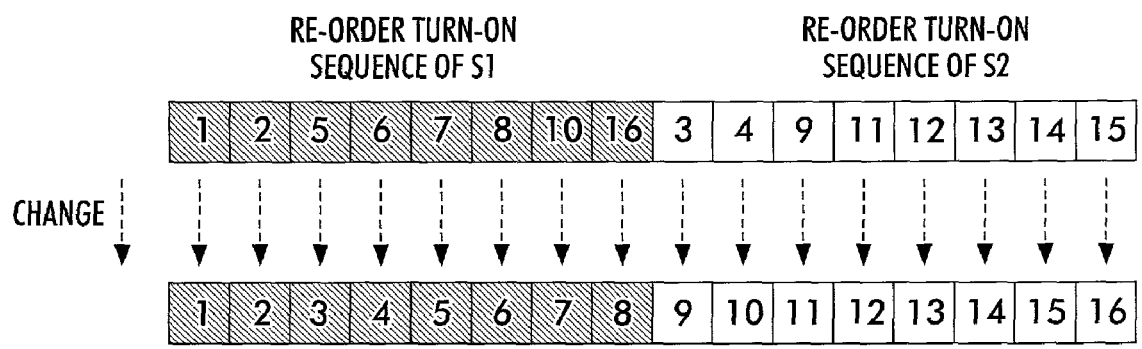
FIG. 4 is a diagram illustrating the step of re-ordering the pixel turn-on sequence.
Figure 5:
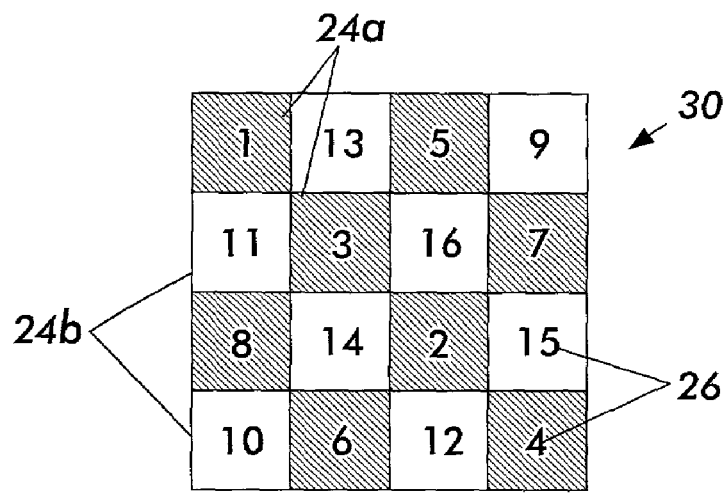
FIG. 5 is a diagram of the re-ordered pixel turn-on sequence.

Referring to FIGS. 4 and 5, the partitioned turn-on sequence 28 is then re-ordered by changing the pixel turn-on sequence values 26 of the screen elements 24 (pixels) to fill one of the partitions, here S1, with the lowest turn-on values 26 in the entire turn-on sequence before filling the second partition S2 with the highest turn-on values 26 in the turn-on sequence. In this example, the pixel turn-on sequence in S1 is re-ordered, using all the pixel turn-on sequence values in S so that the turn-on sequence values 26 having the lowest values, 1-8 in this example, reside in partition S1 and the turn-on sequence values 26 having the highest values, 9-16 in this example, reside in partition S2.

The re-ordering step can be accomplished in any suitable manner. One example of the re-ordering step, which should not be considered limiting, includes: a) replacing the lowest stochastic screen pixel turn-on value before re-ordering contained in one partition with a replacement value which is the lowest stochastic screen pixel turn-on sequence value of all partitions of the screen; b) replacing the next lowest stochastic screen pixel turn-on value in the one partition with a replacement value which is the next lowest stochastic screen pixel turn-on sequence value of all partitions of the screen; c) repeating step b) until the one partition is filled with the lowest stochastic screen pixel turn-on sequence values of all partitions of the screen; and d) repeating steps a) through c) to re-order each of the other partitions in turn with the remaining unused replacement values.

Thus, as illustrated in FIG. 4, the lowest turn-on value of the entire screen S is placed in the screen element 24a of S1 having the lowest turn-on value 26 before re-ordering. In the example provided, the screen element 24a of S1 having the lowest value before re-ordering contains a 1, so this value is not changed. The S1 screen element 24a having the next lowest value before re-ordering contains a 2, so again this value is not changed. The turn-on value 26 of the screen element in S1 having the next lowest value before re-ordering, a 5, is changed to a 3. The turn-on value 26 of the screen element in S1 having the next lowest value, a 6, is changed to a 4. This is continued until screen S1 contains the lowest turn-on values, 1-8.

This process is repeated for the second partition S2. The turn-on value 26 of the S2 screen element 24b having the lowest value before reordering, a 3, is changed to the next lowest turn-on value in the sequence, that is a 9. The turn-on value of the S2 screen element 24b having the next lowest value, a 4, is changed to next lowest turn-on value in the sequence, a 10. This is continued until screen S2 contains the highest turn-on values 9-16. The resulting re-ordered turn-on sequence 30 is illustrated in FIG. 5.

The re-ordering step can also be accomplished by: a) obtaining a subsequence for each partition by arranging the pixels within the partition in increasing order of turn-on sequence values, b) concatenating the subsequences for the different partitions (in any order) to form a single sequence, and order of turn-on values to obtain the new turn-on sequence.

Figure 6:
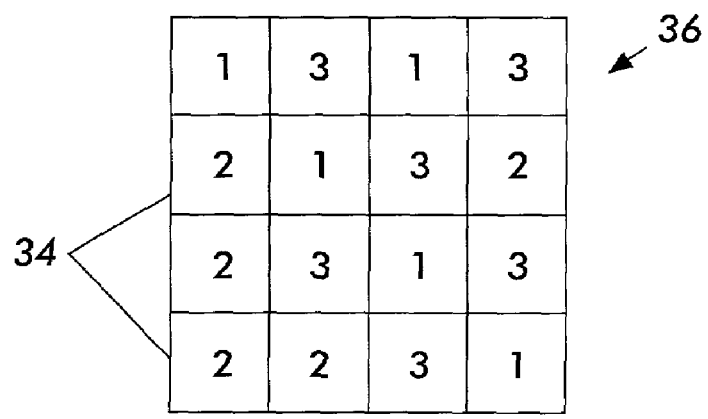
FIG. 6 is a diagram illustrating the output of a stochastic halftone screen.

Referring to FIG. 6, the re-ordered pixel turn-on sequence 30 is then converted to threshold values shown at 34 in a known manner to form a stochastic halftone screen 36. The threshold values 34 output from the halftone screen 36 includes a number of different values corresponding to the bit depth of the input signal.

For the present example, in order to obtain a halftone screen 36 with 3-threshold levels for halftoning a 2-bit input signal from the re-ordered pixel turn-on sequence 30 illustrated in FIG. 5, the pixel turn-on sequence 30 is converted to threshold values between 1 and 3 by mapping the pixels to the thresholds according to the pixel turn-on sequence. The pixels corresponding to values 1 through a number, such as h1, are mapped to threshold value 1, pixels corresponding to values h1+1 through h2 are mapped to threshold value 2, and pixels corresponding to values h2+1 through 16 are mapped to threshold value 3.

A simple illustrative mapping is obtained by spacing the values h1, h2, and h3 substantially linearly so that:

$h1 = \text{round}(16/3) = 5$ $h2 = \text{round}(16*2/3) = 11$ $h3 = \text{round}(16*3/3) = 16$ However, any other suitable nonlinear spacings of the values 34 can also be used.

The tonal intensity value of the input image will then be used to determine which pixels are rendered, that is actually turned on resulting in a printed output, and those which remain off and thus are not printed. For the purpose of this example, using a 2-bit image having a constant tonal intensity value of 25%, or 1 out of 0-3, only the 1's are turned on, or rendered, resulting in black pixels represented by the cross-hatched squares 40 in the halftone output pattern 42 illustrated in FIG. 7. The black pixels 40 occupy S1 screen elements 24a and are printed in only one pass making the rendered pattern less sensitive to inter-pass mis-registration than known methods of halftoning.

By providing the re-ordered turn-on sequence 30 in accordance with the invention, the minority pixels in the highlights, that is the pixels turned on or printed, will be restricted to a minimum number of partitions or printer passes. Also, the minority pixels in the shadows, that is the pixels not turned on or not printed, are restricted to a minimum number of partitions or printer passes. The halftoning method described above reduces the sensitivity of the highlights and shadows, where graininess and visibility is a significant problem, to mis-registration between passes. Stated another way, the re-ordered turn-on sequence 30 restricts the pixels turned on to render a tone to the minimum number of partitions, and thus passes, required to produce the tone.

The invention can be extended to any desired number of partitions or passes, such as for example, 4 partitions for four-pass printing. A stochastic screen pixel turn-on sequence is generated using any known method of stochastic screening for four-pass rendering. The pixel turn-on sequence is partitioned into 4 partitions and then re-ordered to restrict a substantial majority of the pixels turned on to render a tone to the minimum number of passes to produce the tone. After re-ordering, the first partition S1 contains the lowest pixel turn-on values. The second partition, S2 contains the next lowest pixel turn-on values, the third partition, S3 contains the next lowest pixel turn-on values, and the fourth partition S4 contains the highest pixel turn on values.

In this example of halftoning for four-pass printing, if an input image has a tonal intensity value of from 0 to 25%, the pixels actually turned on or rendered will be restricted to only one of the partitions or passes. If the tonal intensity value of the image is between 26% to 50% the pixels actually turned on or rendered will be restricted to only two of the partitions or passes. If the tonal intensity value of the image is between 51% to 75% the pixels actually turned on or rendered will be restricted to only three of the partitions or passes. If the tonal intensity value of the image between 76% and 100%, the image is clearly a shadow, and the minority white or non-printed pixels will be restricted to a minimum number of partitions or passes, the fourth partition or last pass.

An alternate embodiment of the invention can provide an even more pleasing pixel arrangement in the rendered image by blending some of the pixels turned on to render a tone into other partitions, or passes, rather than strictly adhering to restricting all the pixels turned on to render the tone to the minimum number of passes. In the two-pass example above, some of the rendered pixels for an image having a tonal intensity value of 25% may be kept or placed in the second partition S2. However, a substantial majority of the pixels turned on to render a tone will still be restricted to the minimum number of passes required to produce the tone. The substantial majority can be approximately 75% or more, and more preferably approximately 90% or more, of the pixels required to produce the tone.

For comparison, FIG. 8 illustrates a halftone output pattern 44 generated using the pixel turn-on sequence 20 shown in FIG. 2. The halftone output pattern 44 does not restrict a substantial majority of the on pixels 46 to a single partition and is therefore more sensitive to inter-pass mis-registration.

Another alternate embodiment includes generating a stochastic screen directly based on a constraint which enforces a restriction to one of the partitions in the highlights and the shadows and an unconstrained design in the remaining regions of the tone scale. This can be realized by optimizing the merit function for the single overall screen turn-on sequence, with explicit constraints in the optimization process to restrict a substantial majority of the black pixels in the highlights to a minimum number of partitions and correspondingly restricting a majority of the white pixels in the shadows to a minimum number of partitions.

Still another embodiment of the present invention includes using error diffusion halftoning to turn on the proper pixels, on a pixel-by-pixel basis, to render the image. An example of the invention using two partitions, such as the checkerboard partition 10, includes adding a bi-level zero mean bias "image" signal which takes a positive value +D over one partition and a negative value −D over the other partition. The bi-level zero mean bias value can be added to either the thresholds or the input image as described below. For the case of the common checkerboard partition 10 shown in FIG. 1, the zero mean bias signal D is shown graphically in FIG. 9.

A value of D between 32 and 64 has been found to provide satisfactory results when added to the input image having 256 possible tonal values. The value of D controls the degree to which the minority pixels are coerced towards, or restricted to, a single partition. The value of D can be scaled to suit input images having a lower or higher number of tonal values. Adding the zero mean bias signal in this manner causes a substantial majority, as defined above, of the pixels turned on to render a tone to be restricted to the minimum number of passes required to produce the tone. The zero mean bias signal causes a majority of the minority black pixels in the highlights to be localized to one of the partitions and a majority of the minority white pixels in the shadows to be localized to another one of the partitions. Since the added "image" signal is zero mean bias, the added signal does not influence the overall tone scale.

Figure 10:
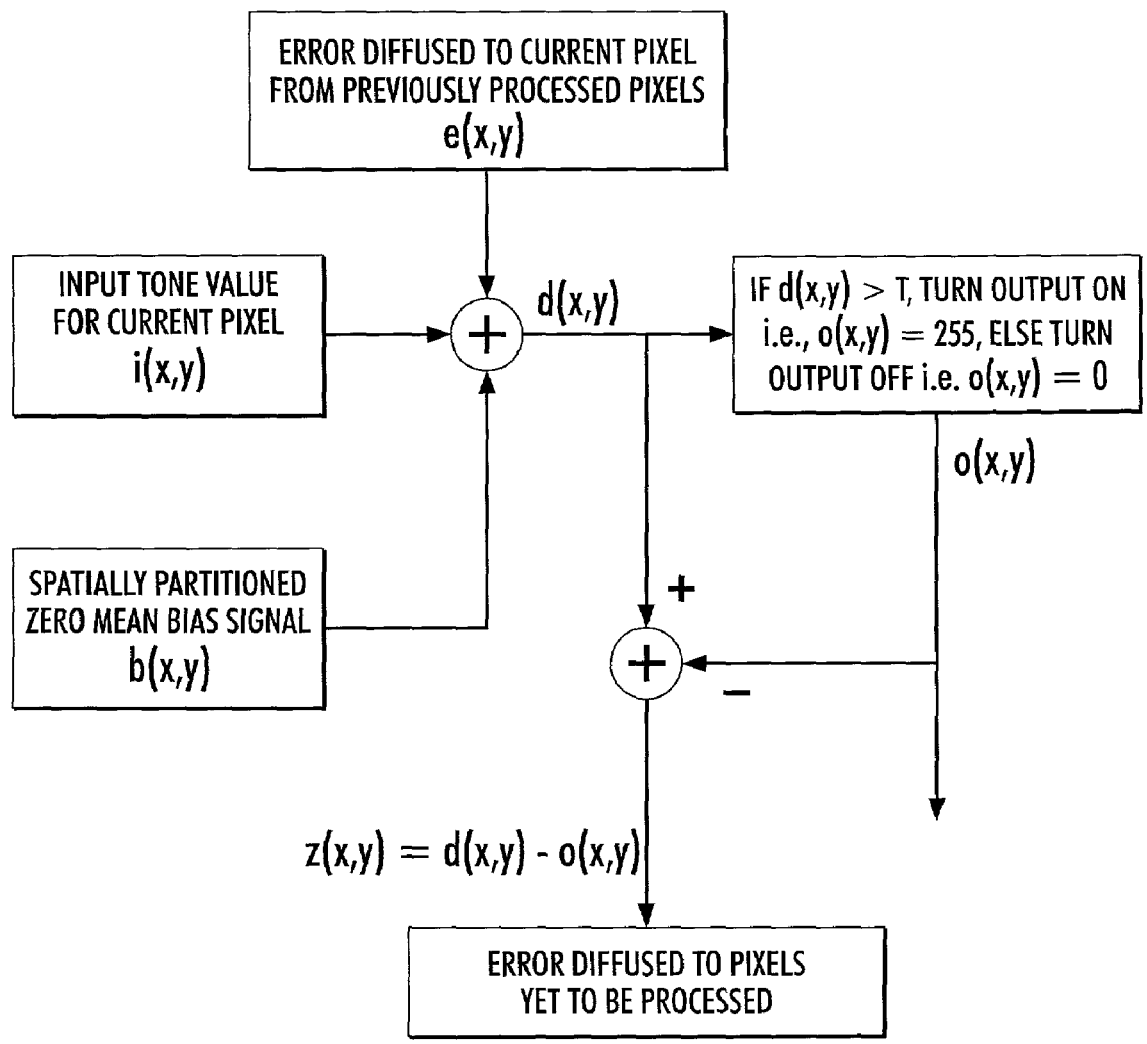
FIG. 10 is a block diagram illustrating the method of error diffusion in accordance with the invention.

Referring to FIG. 10, the method of halftoning using error diffusion in which the zero mean signal is added to the input tone value is shown. The method includes providing an input image having a plurality of pixels, each having an input tone value. The input image partitioned into the appropriate number and arrangement of partitions, in this example a checkerboard partition is used although any suitable known number and arrangement of partitions can be used. Each input image pixel is processed and the zero mean bias image signal is added to the current pixel being processed based on which partition the pixel has been assigned. The zero mean bias signal, shown as $b(x,y)$ is positive, that is +D, for one of the partitions and negative, that is −D, for the other. The error diffused from the previously processed pixels $e(x,y)$ is also added to achieve the desired value for the current pixel $d(x,y)$.

The desired pixel value $d(x,y)$ is then compared to a fixed threshold T, with T=127 in this example. If the desired value $d(x,y)$ is greater than a fixed threshold T, the output value for the current pixel $o(x,y)$ is set to 255 and turned on, otherwise the output $o(x,y)$ is set to 0 and not turned on. The output value $o(x,y)$ is subtracted from the desired value for the current pixel $d(x,y)$ to provide an error value for the current pixel $z(x,y)$ which is diffused to pixels yet to be processed in a known manner.

Figure 11:
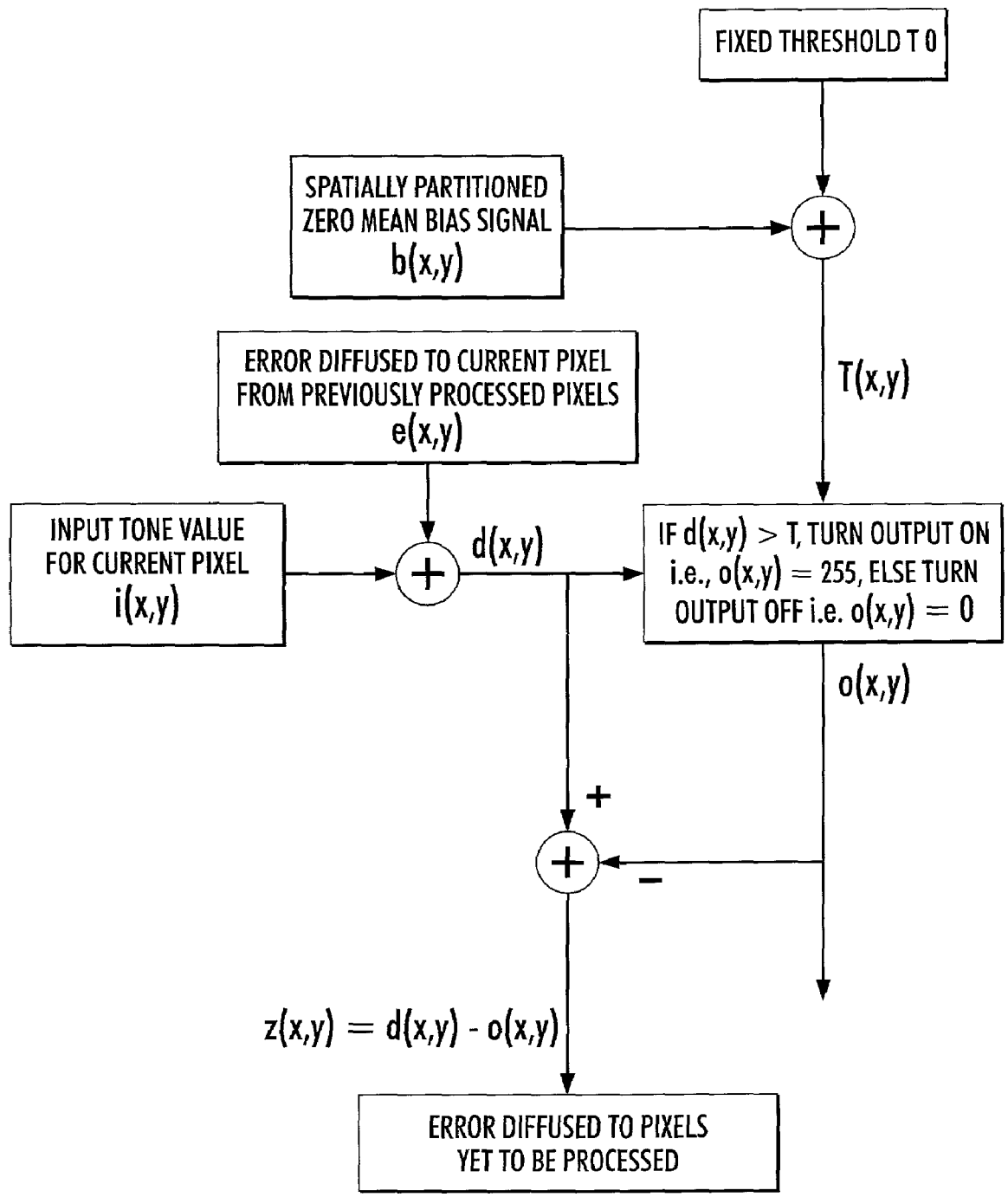
FIG. 11 is a block diagram illustrating an alternate embodiment of the method of error diffusion in accordance with the invention.

Yet another embodiment of the invention using error diffusion is illustrated in FIG. 11. The method is similar to the previously described method of error diffusion, except that the zero mean bias signal $b(x,y)$ is added to the threshold values based on which partition the current pixel being processed has been assigned. In effect, the threshold values are also partitioned in a manner similar to the input image pixels, as shown graphically in FIG. 9. Positive values of the zero mean bias signal, that is +D, are added to each threshold value corresponding to one partition 124a and negative values, that is −D, are added to each threshold value corresponding to the other partition 124b. The fixed threshold value T0, is 127 in the present example, which is approximately 50% of the possible 256 input tone values, however, any suitable known threshold value can be used.

Figure 12:
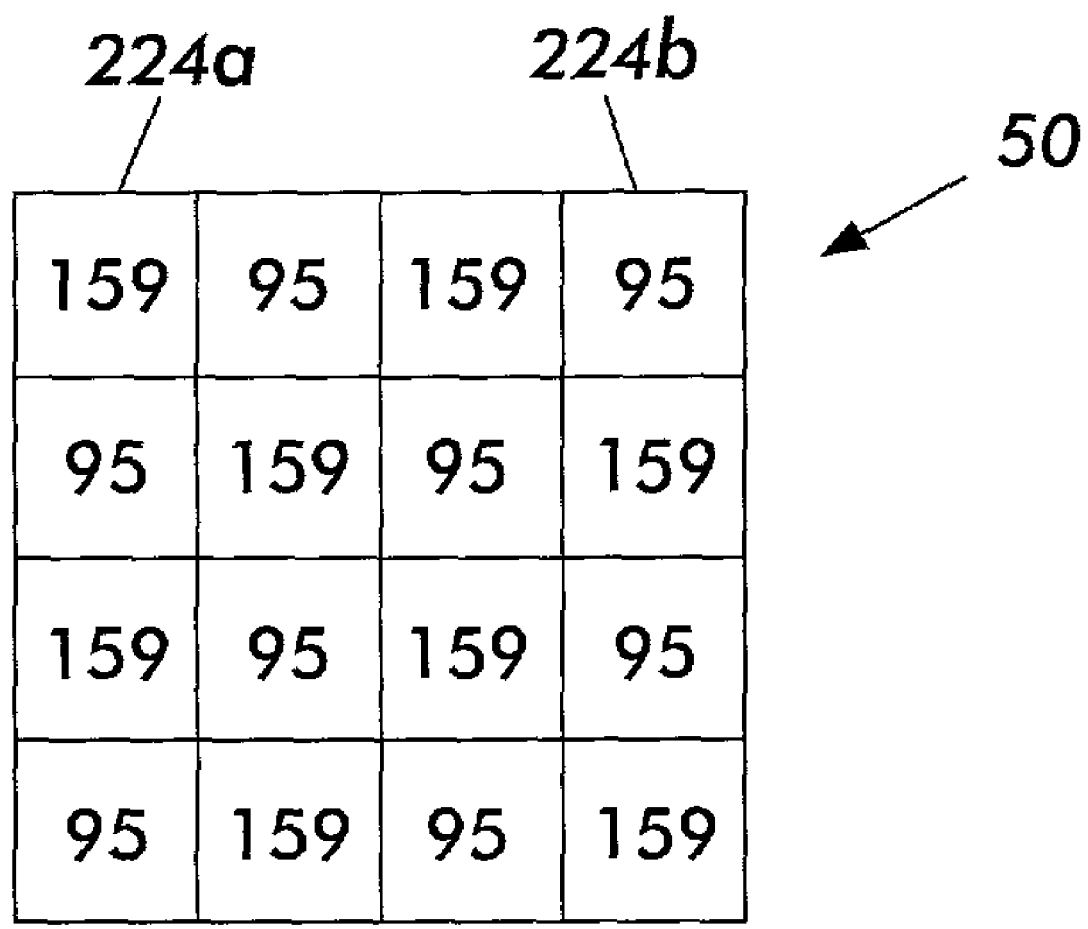
FIG. 12 is a diagram illustrating the threshold values used in the alternate embodiment shown in FIG. 10.

In the example for a checkerboard partition arrangement illustrated generally at 50 in FIG. 12, the zero mean bias signal +D and −D, also shown as $b(x,y)$ in FIG. 11, is 32. The threshold values in the first partition, where $T(x,y)=T0+b(x,y)=127+32=159$ is used for elements 224a and the threshold values in the other partition, where $T(x,y)=T0+b(x,y)=127+(−32)=95$ is used for elements 224b.

If the desired value $d(x,y)$ is greater than the threshold $T(x,y)$, the output value for the current pixel $o(x,y)$ is set to 255 and turned on, otherwise the output $o(x,y)$ is set to 0 and not turned on. The output value $o(x,y)$ is subtracted from the desired value for the current pixel $d(x,y)$ to provide an error value for the current pixel $z(x,y)$ which is diffused to pixels yet to be processed in a known manner.

The invention can also be readily applied to the printing of color images. The invention can be used on a separation by separation basis for each color separation using any known halftoning method including those described above. Other examples of color halftoning methods generating screens which can be reordered to reduce the effects of multi-pass mis-registration include, but are not limited to, vector methods for stochastic color screening as described in Pending U.S. patent application Ser. No. 09/602,746, filed Jun. 23, 2000 which is hereby incorporated by reference herein.

Further, the error diffusion methods described above can be combined with any other known methods of error diffusion, including but not limited to the sum-and-difference or semi-vector techniques for error diffusion disclosed in U.S. Pat. Nos. 6,072,591 and 6,014,233 which are hereby incorporated by reference herein.

Figure 13:
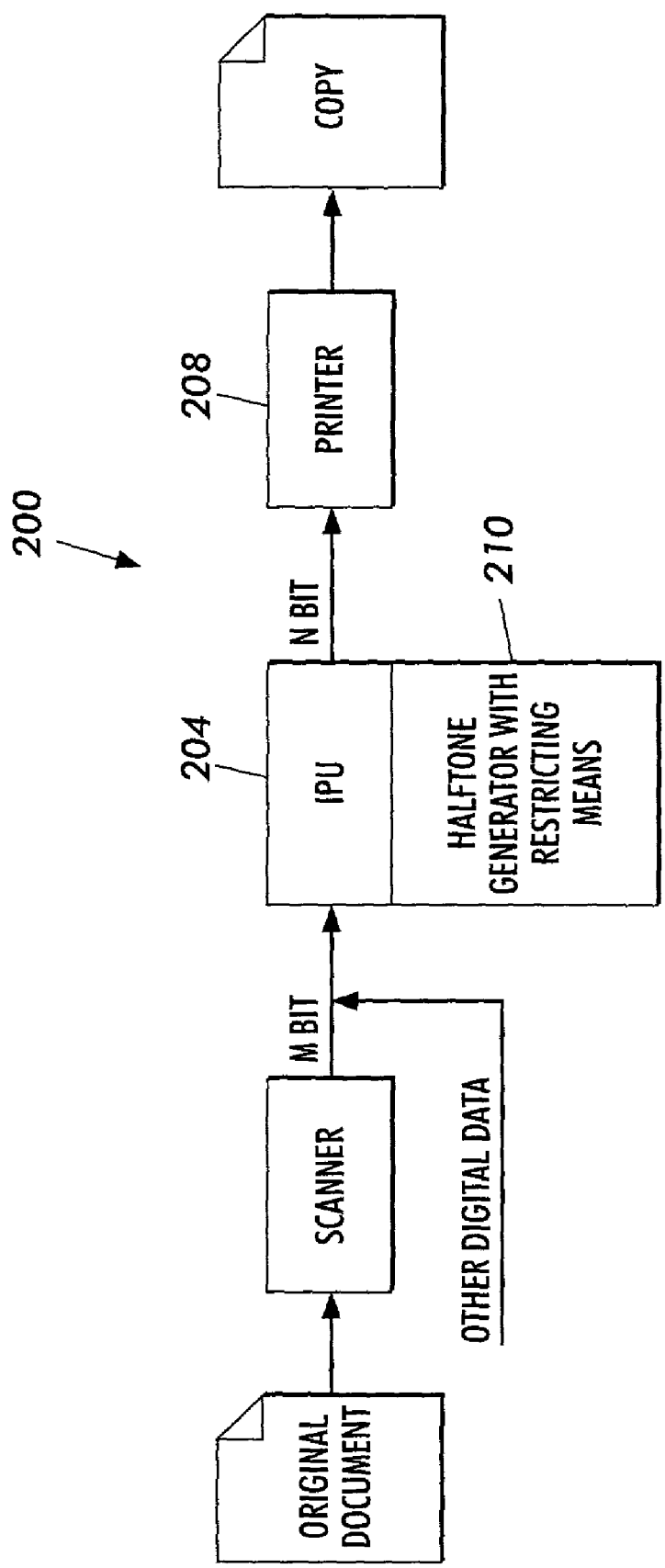
FIG. 13 is a diagram illustrating a system of halftoning for multi-pass rendering in accordance with the invention.

Referring to FIG. 13, the invention also includes a system for multi-pass rendering shown generally at 200. An input image, as described above, forming an electronic representation of an original document is directed to an image processing unit (IPU) 204 to be processed. The IPU 204 produces an output image rendering suitable for printing on a multi-pass printer 208. The IPU 204 includes a halftone generator 210 including means for restricting a substantial majority, as defined above, of the pixels turned on to render a tone to the minimum number of passes required to produce the tone in a variety of manners as described above.

In one embodiment, the halftone generator 210 can be a halftone screen generator including a stochastic screen pixel turn-on sequence generator for creating a stochastic screen pixel turn-on sequence in the manner described above, and means for partitioning the stochastic screen pixel turn-on sequence into a plurality of partitions as described above. The restricting means includes means for re-ordering the stochastic screen pixel turn-on sequence to restrict a substantial majority, as defined above, of the pixels turned on to render a tone to the minimum number of passes required to produce the tone in a manner described above.

In another embodiment, the halftone generator 210 can generate the halftones using error diffusion as described above. The halftone generator 210 can include means for partitioning the input image into a plurality of partitioned pixel tone values in a manner described above, means for processing the partitioned pixel tone values to produce a previously processed pixel error diffusion value in a manner described above.

The halftone generator 210 can also include means for processing a current partitioned input pixel tone value including means for adding the previously processed pixel error diffusion value to the current partitioned input pixel tone value to achieve a desired pixel value in the manner described above, and means for comparing the desired pixel value with a threshold value to produce an output signal for rendering the image in the manner described above. The restricting means can include means for adding a zero mean bias signal to the current partitioned input pixel tone value, where the zero mean bias signal is based on the partition containing the partitioned pixel tone value as described above.

In an alternate embodiment the restricting means includes means for adding a zero mean bias signal to the threshold value, rather than the input pixel tone value, where zero mean bias signal is based on the partition containing the partitioned pixel tone value as described above.

The invention has been described with reference to preferred embodiments. Obviously, modifications and alterations will occur to others upon reading and understanding the preceding specification. It is intended that the invention be construed as including all such modifications and alterations insofar as they come within the scope of the appended claims or the equivalents thereof.

What is claimed is:

1. A method of halftoning an image having at least one of pixels forming image highlights and pixels forming image shadows performed by an image processing unit (IPU) halftone generator for multi-pass rendering wherein different pixel locations are rendered in each pass comprising:
generating a stochastic screen pixel turn-on sequence of turn-on sequence values representing the turn-on sequence order for corresponding image pixels from an input image;
partitioning the stochastic screen pixel turn-on sequence into a plurality of partitions, wherein each partition corresponds to a different pass of a multi-pass printer used in printing the image;
re-ordering the stochastic screen pixel turn-on sequence to restrict a substantial majority of the pixels turned on to render a tone to the minimum number of passes required to produce the tone in the image, the re-ordering restricting at least one of pixels in the image highlights turned on for printing to a minimum number of partitions needed for rendering the image highlights and pixels in the image shadows not turned on for printing to a minimum number of partitions needed for rendering the image shadows; and
generating a stochastic halftone screen using the re-ordered stochastic screen pixel turn-on sequence.

2. The method of halftoning defined in claim 1 wherein the substantial majority is approximately 75% or more of the pixels turned on to render a tone.

3. The method of halftoning defined in claim 1 wherein the substantial majority is approximately 90% or more of the pixels turned on to render a tone.

4. The method of halftoning defined in claim 1 wherein the re-ordering step includes placing the lowest stochastic screen pixel turn-on sequence values in one partition and the highest stochastic screen pixel turn-on sequence values in another partition.

5. The method of halftoning defined in claim 4 wherein the re-ordering step further includes:
a) replacing the lowest stochastic screen pixel turn-on value before re-ordering contained in one partition with a replacement value which is the lowest stochastic screen pixel turn-on sequence value of all partitions of the screen;
b) replacing the next lowest stochastic screen pixel turn-on value in the one partition with a replacement value which is the next lowest stochastic screen pixel turn-on sequence value of all partitions of the screen;
c) repeating step b) until the one partition is filled with the lowest stochastic screen pixel turn-on sequence values of all partitions; and
d) repeating steps a) through c) to re-order each of the other partitions in turn with the remaining unused replacement values.

6. The method of halftoning defined in claim 4 wherein the re-ordering step further includes:
a) obtaining a subsequence for each partition by arranging the pixels within the partition in increasing order of turn-on sequence values;
b) concatenating the subsequences for the different partitions, in any order, to form a single sequence; and
c) renumbering the resulting single sequence in increasing order of turn-on values to obtain the new turn-on sequence.

7. The method of halftoning defined in claim 1 wherein the partitioning step includes partitioning the stochastic screen pixel turn-on sequence into two partitions.

8. The method of halftoning defined in claim 7 wherein the partitions are designated S1 and S2 and the merit function is $\tilde{M}(S)=M(S)+w_1*M(S1)+w_2*M(S2)$, where $M(S)$ is a merit function suitable for a single stochastic screen and $w_1$ and $w_2$ are weighting factors in the range of 2 to approximately 100.

9. The method of halftoning defined in claim 8 wherein the partitioning step includes partitioning into a checkerboard partition arrangement.

10. The method of halftoning defined in claim 9 wherein the step of generating a stochastic screen pixel turn-on sequence includes generating a halftone screen for a checkerboard partition such that the pixels can be classified as belonging to the two partitions using the coordinates of columns and rows, i and j, and the mathematical rule $$p(i,j) \in S1, if (i+j)\%2=0;$$

$$p(i,j) \in S2, if (i+j)\%2=1;$$

$$S=S1+S2$$

and optimizing the merit function $$\tilde{M}(S)=M(S)+w_1*M(S1)+w_2*M(S2),$$

where $w_1$ and $w_2$ are weighting factors each in the range of approximately 2 to approximately 100.

11. The method of halftoning defined in claim 10 wherein $w_1 \approx 3$ and $w_2 \approx 3$.

12. The method of halftoning defined in claim 1 wherein the partitioning step includes partitioning the stochastic screen pixel turn-on sequence into four partitions for four-pass printing and the re-ordering places a substantial majority of the lowest pixel turn-on values in the first partition, a substantial majority of the next lowest pixel turn-on values in a second partition, and a substantial majority of the highest pixel turn-on values in the fourth partition.

13. The method of halftoning defined in claim 12 wherein the re-ordering step restricts pixels turned on to render image tones of 0% to 25% to one partition, and restricts pixels turned on to render image tones of 25% to 50% to two partitions, and restricts pixels not turned on to render image tones of 75% to 100% to the fourth partition corresponding to the last printer pass.

14. A method of halftoning an image having at least one of pixels forming image highlights and pixels forming image shadows performed by an image processing unit (IPU) halftone generator for multi-pass rendering wherein different pixel locations are rendered in each pass comprising:
providing an input image having a plurality of pixels each having an input tone value;
partitioning the input image pixels into partitions wherein each partition corresponds to a different pass of multi-pass printing; and
processing the input image pixels on a pixel-by-pixel basis using error diffusion halftoning restricting a substantial majority of the pixels turned on to render a tone in the image to the minimum number of passes required to produce the tone restricting at least one of pixels in the image highlights turned on for printing to one of the partitions and pixels in the image shadows not turned on for printing to another one of the partitions including:

adding a zero mean bias signal to each input image pixel tone value having a value based on the partition containing the input image pixel, adding an error diffused from previously processed pixels to the input tone value of each input image pixel being processed to achieve a desired pixel value for the pixel, and comparing the desired pixel value of each pixel being processed with a threshold value to turn on or not turn on each pixel for rendering the image.

15. The method of halftoning defined in claim 14 wherein the partitioning step includes partitioning the input image pixels into two partitions.

16. The method of halftoning defined in claim 15 wherein the partitioning step includes partitioning the input image pixels into a checkerboard partition.

17. The method of halftoning defined in claim 15 wherein the zero mean bias signal has a value of +D for one partition and −D for the other partition.

18. The method of halftoning defined in claim 17 wherein the input image tone value can be one of 256 values and the value of D is between approximately 32 and 64.

19. A method of halftoning an image having at least one of pixels forming image highlights and pixels forming image shadows performed by an image processing unit (IPU) halftone generator for multi-pass rendering wherein different pixel locations are rendered in each pass comprising:

providing an input image having a plurality of pixels each having an input tone value;

partitioning the input image pixels into partitions wherein each partition corresponds to a different pass of multi-pass printing; and processing the input image pixels on a pixel-by-pixel basis using error diffusion halftoning restricting a substantial majority of the pixels turned on to render a tone in the image to the minimum number of passes required to produce the tone restricting pixels in the image highlights turned on for printing to one of the partitions and pixels in the image shadows not turned on for printing to another one of the partitions including:

adding an error diffused from previously processed pixels to the input tone value of each input image pixel being processed to achieve a desired pixel value for the pixel, and comparing the desired pixel value of each pixel being processed with a threshold value added to a zero mean bias signal to turn on or not turn on each pixel for rendering the image, wherein the zero mean bias signal has a value based on the partition containing the pixel being processed.

20. The method of halftoning defined in claim 19 wherein the partitioning step includes partitioning the input image pixels into two partitions.

21. The method of halftoning defined in claim 20 wherein the partitioning step includes partitioning the input image pixels into a checkerboard partition.

22. The method of halftoning defined in claim 20 wherein the zero mean bias signal has a value of +D for one partition and −D for the other partition.

23. The method of halftoning defined in claim 22 wherein the input image tone value can be one of 256 values and the value of D is between approximately 32 and 64.

24. A halftone generator for halftoning for multi-pass rendering of an image having at least one of forming image highlights and pixels forming image shadows, wherein different pixels are rendered in each pass, the halftone generator comprising:

means for partitioning an input image having a plurality of input pixel tone values into a plurality of partitions having pixel tone values wherein each partition corresponds to a different pass of multi-pass printing; and means for restricting a substantial majority of the pixels turned on to render a tone to the minimum number of passes required to produce the tone restricting at least one of pixels in the image highlights turned on for printing to one of the partitions and pixels in the image shadows not turned on for printing to another one of the partitions.

25. The halftone generator defined in claim 24 wherein the means for partitioning further comprises:

a stochastic screen pixel turn-on sequence generator generating a stochastic screen pixel turn-on sequence; and means for partitioning the stochastic screen pixel turn-on sequence into a plurality of partitions each partition corresponding to a different pass, wherein the means for restricting includes means for re-ordering the stochastic screen pixel turn-on sequence to restrict a substantial majority of the pixels turned on to render a tone to the minimum number of passes required to produce the tone.

26. The halftone generator defined in claim 24 further comprising:

means for processing the partitioned pixel tone values to produce a previously processed pixel error diffusion value;

means for processing a current partitioned input pixel tone value including means for adding the previously processed pixel error diffusion value to the current partitioned input pixel tone value to achieve a desired pixel value; and means for comparing the desired pixel value with a threshold value to produce an output signal for rendering the image, wherein the means for restricting includes means for adding a zero mean bias signal to the current partitioned input pixel tone value, the zero mean bias signal being based on the partition containing the partitioned pixel tone value.

27. The halftone generator defined in claim 24 further comprising:

means for processing the partitioned pixel tone values to produce a previously processed pixel error diffusion value;

means for processing a partitioned input pixel tone value including means for adding the previously processed pixel error diffusion value to the partitioned input pixel tone value to achieve a desired pixel value; and means for comparing the desired pixel value with a threshold value to produce an output signal for rendering the image, wherein the means for restricting includes means for adding a zero mean bias signal to the threshold value, the zero mean bias signal being based on the partition containing the partitioned pixel tone value.

* * * * *